(12) United States Patent
Hajdukiewicz et al.

(10) Patent No.: US 7,496,580 B2
(45) Date of Patent: Feb. 24, 2009

(54) APPARATUS AND METHOD FOR PROCEDURAL OPERATIONS DEVELOPMENT AND DISTRIBUTION

(75) Inventors: John R. Hajdukiewicz, Cambridge, MA (US); Peter Bullemer, Independence, MN (US)

(73) Assignee: Honeywell International Inc., Morristown, NJ (US)

( * ) Notice: Subject to any disclaimer, the term of this patent is extended or adjusted under 35 U.S.C. 154(b) by 255 days.

(21) Appl. No.: 11/402,458

(22) Filed: Apr. 11, 2006

(65) Prior Publication Data

US 2007/0260607 A1 Nov. 8, 2007

(51) Int. Cl.
  *G06F 7/00* (2006.01)
  *G06F 17/30* (2006.01)
  *G06F 17/00* (2006.01)
(52) U.S. Cl. .................................. 707/10; 707/100
(58) Field of Classification Search .............. 707/1, 707/10, 100–102, 3, 4, 104.1; 705/1, 7, 8; 715/779
See application file for complete search history.

(56) References Cited

U.S. PATENT DOCUMENTS

| | | | | |
|---|---|---|---|---|
| 5,590,331 | A * | 12/1996 | Lewis et al. | 717/144 |
| 7,149,699 | B2 * | 12/2006 | Barnard et al. | 705/7 |
| 7,415,537 | B1 * | 8/2008 | Maes | 709/246 |
| 2001/0044797 | A1 * | 11/2001 | Anwar | 707/102 |
| 2003/0233366 | A1 * | 12/2003 | Kesselman et al. | 707/100 |
| 2004/0002949 | A1 * | 1/2004 | Iwata et al. | 707/1 |
| 2004/0148292 | A1 * | 7/2004 | Clemens | 707/100 |
| 2005/0149536 | A1 * | 7/2005 | Wildes et al. | 707/100 |
| 2005/0182650 | A1 * | 8/2005 | Maddox et al. | 705/1 |
| 2005/0234864 | A1 * | 10/2005 | Shapiro | 707/1 |
| 2006/0026162 | A1 * | 2/2006 | Salmonsen et al. | 707/10 |
| 2006/0164269 | A1 * | 7/2006 | Trimbell et al. | 341/106 |
| 2006/0282441 | A1 * | 12/2006 | Weller et al. | 707/100 |

OTHER PUBLICATIONS

Richard Kucharyson, "Effective Procedural Operations ProcOps 101, A milestone in Process Control Strategies," Version 2.0, Honeywell, 2004, 40 pages.
White Paper, "Operations Management Pro," Honeywell, 2004, 16 pages.
Service Note, "Effective Procedural Operations Service (EPOS)," Honeywell, Apr. 28, 2005, 2 pages.

\* cited by examiner

*Primary Examiner*—Don Wong
*Assistant Examiner*—Merilyn P Nguyen
(74) *Attorney, Agent, or Firm*—Munck Carter P.C.

(57) ABSTRACT

A method includes storing information defining a plurality of procedures to be followed. The method also includes receiving a request for the information associated with at least one of the procedures. The method further includes formatting the requested information based on a platform to receive the requested information. In addition, the method includes providing the formatted requested information to the platform. Formatting the requested information may include formatting the requested information using one of a plurality of templates, where the templates are associated with a plurality of different procedure types. Formatting the requested information may also include formatting the requested information differently based on whether the requested information is to be presented via a console computing device, a mobile device, or a printed document.

21 Claims, 5 Drawing Sheets

APPARATUS AND METHOD FOR PROCEDURAL OPERATIONS DEVELOPMENT AND DISTRIBUTION

TECHNICAL FIELD

This disclosure relates generally to management systems and more specifically to an apparatus and method for procedural operations development and distribution.

BACKGROUND

Organizations such as corporations often define or standardize procedures to be followed by employees or other personnel of the organizations. The procedures could represent any suitable sequence of steps required to perform a specific function, satisfy a particular objective, or otherwise achieve a specified goal. As an example, procedures could be defined to specify how particular operations in a petrochemical plant should be performed. By standardizing its procedures, an organization may encourage the use of streamlined or improved processes and reduce potential risks.

Even though procedures may be defined or standardized with an organization, problems may still occur when the procedures are actually implemented. These problems may include personnel failing to comply with a procedure, having an inadequate amount of time to complete a procedure, having a procedure that is irrelevant to a particular task at hand, or having a procedure that is too lengthy or hard to read. Some of these problems are based on the ways that procedures are presented and how the procedures are used. Not all procedures are alike, and a procedure may have different requirements based on the context of use and the technology being employed.

SUMMARY

This disclosure provides an apparatus and method for procedural operations development and distribution.

In a first embodiment, a method includes storing information defining a plurality of procedures to be followed. The method also includes receiving a request for the information associated with at least one of the procedures. The method further includes formatting the requested information based on a platform to receive the requested information. In addition, the method includes providing the formatted requested information to the platform.

In particular embodiments, formatting the requested information includes formatting the requested information using one of a plurality of templates, where the templates are associated with a plurality of different procedure types.

In other particular embodiments, formatting the requested information includes formatting the requested information differently based on whether the requested information is to be presented via a console computing device, a mobile device, or a printed document.

In a second embodiment, an apparatus includes at least one memory capable of storing information defining one or more procedures to be followed. The apparatus also includes at least one processor capable of receiving a request for the information associated with at least one of the procedures, formatting the requested information based on a platform to receive the requested information, and providing the formatted requested information to the platform.

In a third embodiment, a computer program is embodied on a computer readable medium and is operable to be executed by a processor. The computer program includes computer readable program code for receiving a request for information associated with at least one of a plurality of procedures to be followed, formatting the requested information based on a platform to receive the requested information, and providing the formatted requested information to the platform.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
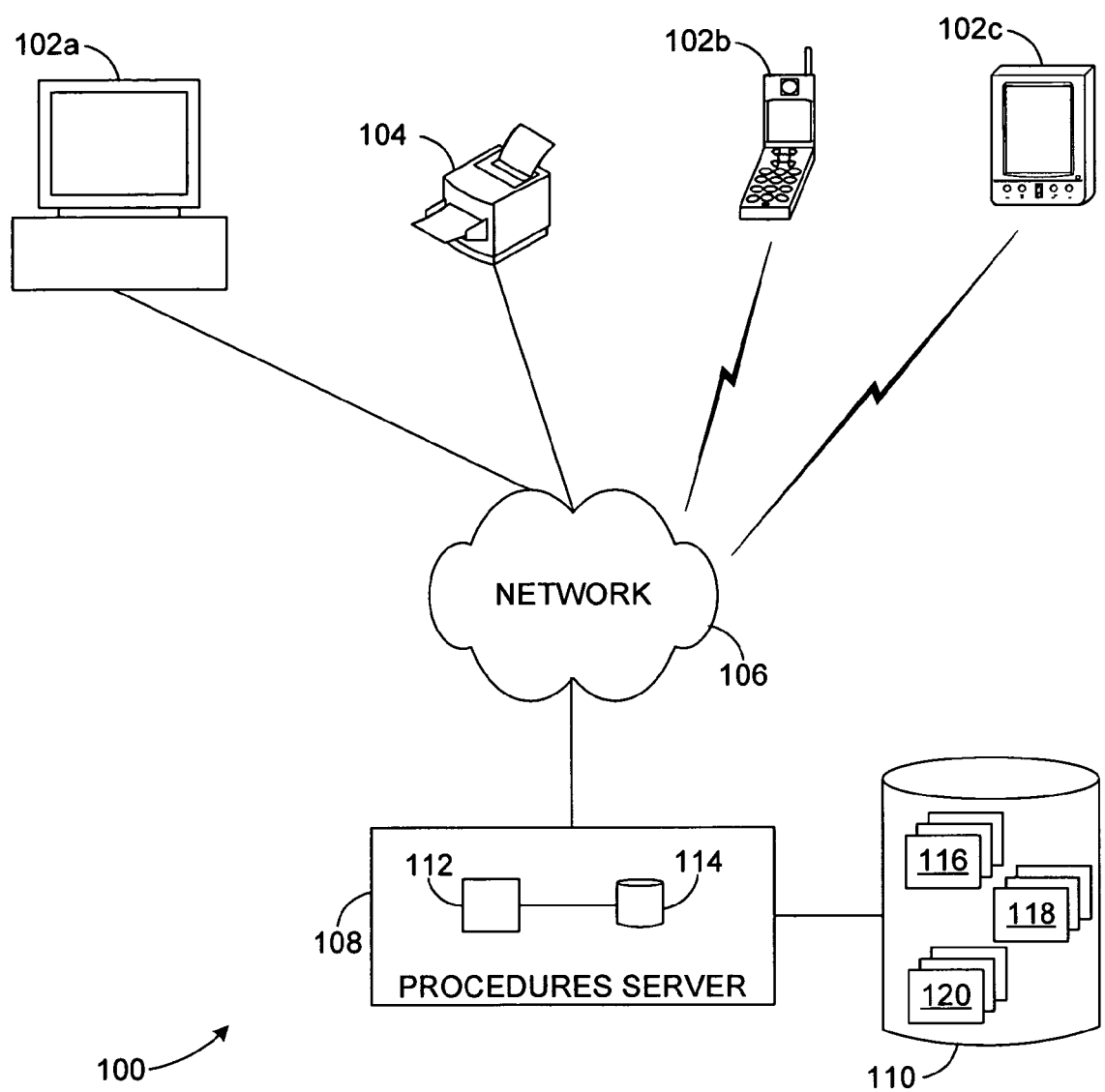
FIG. 1 illustrates an example system for procedural operations development and distribution according to one embodiment of this disclosure.

FIG. 1 illustrates an example system 100 for procedural operations development and distribution according to one embodiment of this disclosure. In the illustrated example, the system 100 includes user devices 102a-102c, a printer 104, a network 106, a procedures server 108, and a database 110. Other embodiments of the system 100 may be used without departing from the scope of this disclosure.

In one aspect of operation, personnel use the user devices 102a-102c (referred to as "user devices 102") to access the procedures server 108 and the database 110. The procedures server 108 provides a mechanism for creating, modifying, and deleting procedures to be followed, such as procedures to be followed in a corporation or other organization. The information associated with the defined procedures is stored in the database 110. Also, personnel may select which platforms (types of user devices 102) can retrieve particular content from the database 110, and the format of that content can be controlled based on the platform retrieving the content. Among other things, this may provide a central repository for procedure-related information, which may allow easier definition, maintenance, access, and use of the procedures.

In the illustrated embodiment, each user device 102 is capable of communicating with the network 106. Each user device 102 represents any suitable device, system, or portion thereof that allows a user to communicate and interact with the procedures server 108. For example, a user device 102 may allow a user to retrieve procedure-related information from the database 110 so that the user can implement a procedure. A user device 102 may also allow a user to access or invoke an application executed by the procedures server 108 in order to define a new procedure or modify an existing procedure.

In this particular example, the user devices 102 include a desktop, laptop, or other console computer (user device 102a), a mobile telephone (user device 102b), and a handheld computer (user device 102c). Each of these user devices 102 communicates over a wireline or wireless connection. These particular user devices 102 are for illustration only. Any other or additional computing or communication devices or platforms may be used in the system 100. Each user device 102 includes any hardware, software, firmware, or combination thereof for accessing or interacting with the procedures server 108.

The printer 104 is coupled to the network 106. The printer 104 allows users to print documents containing procedure-related information, such as MICROSOFT WORD documents, ADOBE PDF documents, or other documents. The printer 104 may represent any suitable printing device, such as a stand-alone printer, a combination printer-fax-scanner device or other multi-function device, or a networked photocopy machine. Although shown as being coupled to the network 106, the printer 104 could be coupled directly to a user device 102 or communicate wirelessly with a user device 102.

The network 106 is capable of communicating with the user devices 102 and the procedures server 108. The network 106 facilitates communication between components of the system 100. For example, the network 106 may communicate Internet Protocol (IP) packets, frame relay frames, Asynchronous Transfer Mode (ATM) cells, or other suitable information between network addresses. The network 106 may include one or more local area networks (LANs), metropolitan area networks (MANs), wide area networks (WANs), all or a portion of a global network such as the Internet, or any other communication system or systems at one or more locations. The network 106 may also operate according to any appropriate type of protocol or protocols, such as Ethernet, IP, X..25, frame relay, or any other protocol.

The procedures server 108 is coupled to the network 106 and the database 110. The procedures server 108 supports the definition and maintenance of procedures to be followed in an organization. For example, the procedures server 108 may receive information defining procedures from users and store the information in the database 110. The procedures server 108 may also allow users to retrieve information associated with procedures that have been defined and provide that information to the user devices 102. The procedures server 108 may further allow users to specify the platforms that can retrieve defined procedures and the formats for those procedures. The procedures server 108 includes any hardware, software, firmware, or combination thereof for defining, maintaining, or accessing procedure-related information. In particular embodiments, the procedures server 108 includes one or more processors 112 and one or more memories 114 containing data and instructions used by the one or more processors 112.

The database 110 is coupled to the procedures server 108. The database 110 stores various information associated with procedures used by an organization. For example, the database 110 could store procedure information 116, which identifies the sequence of steps required to perform a specific function, satisfy a particular objective, or otherwise achieve a specified goal. The database 110 could also store platform information 118, which identifies the platforms associated with the various procedures defined by the procedure information 116. In addition, the database 110 could store format information 120, which identifies the formats used to present information associated with the various procedures.

The database 110 includes any hardware, software, firmware, or combination thereof for storing and facilitating retrieval of information. Also, the database 110 uses any of a variety of data structures, arrangements, and compilations to store and facilitate retrieval of information. Although shown as separate pieces of information 116-120 in FIG. 1, the various pieces of information in FIG. 1 could be combined or further subdivided according to particular needs. As an example, the procedure information 116, platform information 118, and format information 120 for a single procedure could be stored together in the database 110.

In one aspect of operation, users may define procedures to be followed in an organization via the procedures server 108. For example, the procedures server 108 could execute an application that allows users to provide procedure-related content (such as a description of procedure steps), hyperlinks, supporting documentation, conditions, and warnings associated with a procedure. The application could also allow users to select the platform(s) that can retrieve procedures and to specify formatting options for each platform. This information may then be stored in the database 110. In some embodiments, the application executed by the server 108 receives data about a procedure using different data-entry fields, where some fields are mandatory (such as top-level steps of the procedure) and other fields are optional (such as hyperlinks to related information).

As a particular example, the procedures server 108 may provide a framework for quantitatively classifying procedures into different classifications. The classifying may be based, for example, on the complexity of the procedures, the consequences associated with the procedures, and the frequency of using the procedures. The procedures server 108 also allows users to specify whether a classified procedure is available for viewing on a console computer (such as user device 102a), on a mobile device (such as user devices 102b-102c), in paper form (such as via printer 104), or in any other or additional manner. The procedures server 108 further allows users to specify the format of a procedure for a particular platform, such as MICROSOFT WORD or ADOBE PDF documents for console computers or a human-factored small screen display for mobile devices. In some embodiments, the selection of the platforms and formats is based on the context of how a procedure is expected to be used. As an example, procedures employed by personnel working inside buildings at console computer terminals could have certain platforms and formats specified, while procedures employed by personnel working outside in varying locations could have other platforms and formats specified.

Although FIG. 1 illustrates one example of a system 100 for procedural operations development and distribution, various changes may be made to FIG. 1. For example, the system 100 may include any number of user devices 102, printers 104, networks 106, servers 108, and databases 1010. Also, while FIG. 1 illustrates the use of a server 108 in the system 100, the functionality of the server 108 could be implemented on other device(s), such as a desktop computer or a laptop computer. Further, while FIG. 1 illustrates that one database 110 is coupled directly to the procedures server 108, any number of databases 110 may reside at any location or locations accessible by the server 108. In addition, while FIG. 1 illustrates one operational environment in which procedural operations development and distribution could occur, the procedural operations development and distribution mechanism could be used in any other suitable device or system.

Figure 2:
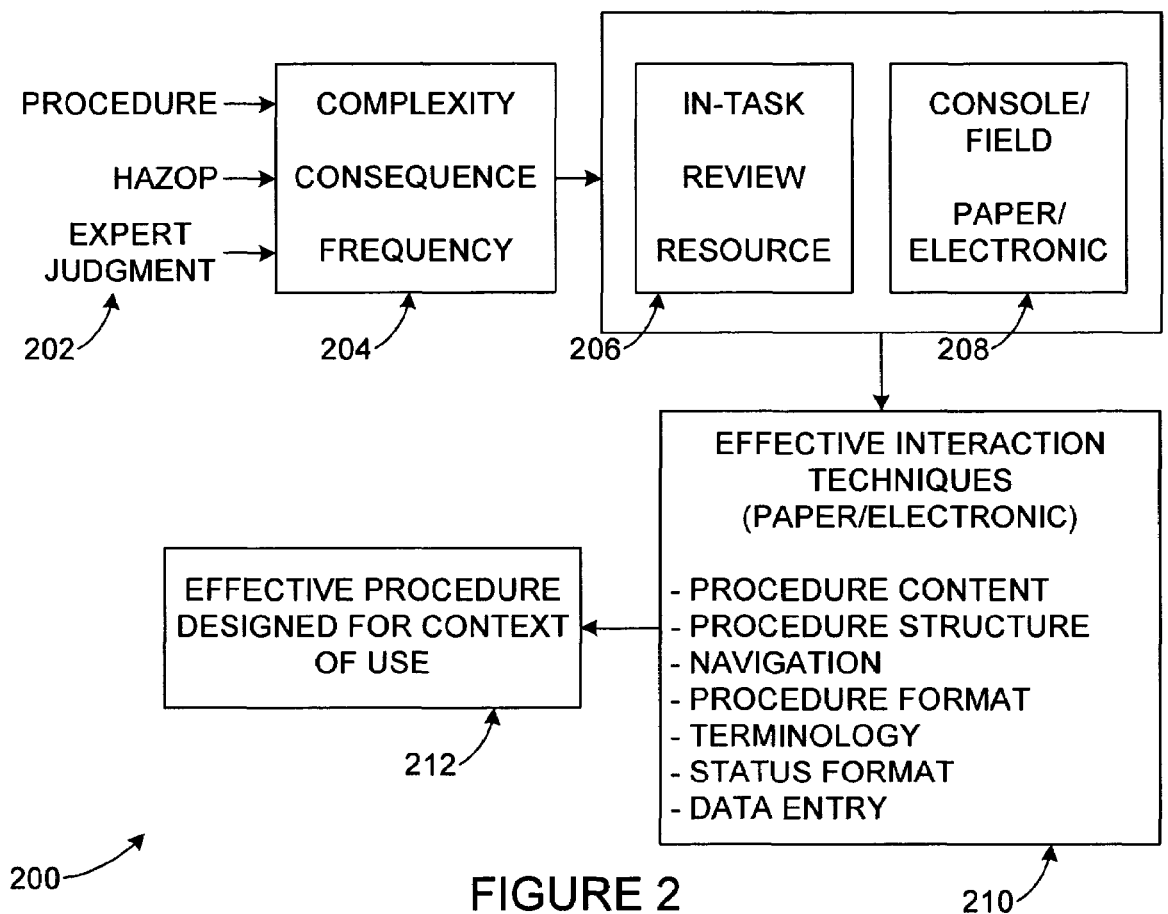
FIG. 2 illustrates an example method for procedural operations development and distribution according to one embodiment of this disclosure.

FIG. 2 illustrates an example method 200 for procedural operations development and distribution according to one embodiment of this disclosure. The method 200 shown in FIG. 2 is for illustration only. Other embodiments of the method 200 could be used without departing from the scope of this disclosure. Also, for ease of explanation, the method 200 is described with respect to the system 100 of FIG. 1. The method 200 could be used with any other suitable device or system.

The method 200 operates by receiving various inputs 202, which represent information associated with a procedure being defined. In this example, the inputs 202 include information about the procedure itself, one or more analyses about the plant or facility in which the procedure is to be used (such as a Hazards and Operability or "HAZOP" analysis), and information from experts.

These inputs 202 are used to make assessments 204 of various risk factors associated with the procedure being defined. In this example, the assessments 204 include a consequence assessment, a frequency assessment, and a complexity assessment. The consequence assessment assesses the potential impact if the procedure is not executed or performed properly. The consequence assessment could, for example, assess the potential impact on personnel safety, operational integrity, and environment health. The frequency assessment assesses the likelihood of using the procedure over time. The complexity assessment assesses the level of challenge for personnel to successfully perform or implement the procedure.

Based on the assessments 204, the procedure being defined is classified into one of multiple classifications 206. In this example, the classifications 206 include a resource classification, a review classification, and an in-task classification. The resource classification is associated with procedures having a low impact risk (such as procedures primarily used for initial training or for reference as a refresher). The review classification is associated with procedures having a moderate impact risk that may be reviewed pre-execution and post-execution. The in-task classification is associated with procedures having a significant impact risk. Procedures classified as in-task may require the use of a checklist (such as a list where personnel initial each step and sign and date the list upon completion of the procedure) and a safety observer or team leader to oversee the execution of the procedure and verify the appropriate completion of critical activities.

The classification 206 of the procedure being defined is combined with one or more contexts of use 208. The contexts of use 208 identify one or more contexts in which the procedure could be used. In this example, the contexts of use 208 include a console context and a field context. The console context of use 208 indicates that the procedure could be used by personnel at computer consoles in a control center or other locations in a facility. The field context of use 208 indicates that the procedure could be used by personnel in the field (such as at or near industrial processing equipment). In this example, the contexts of use 208 also include a paper context and an electronic context. These contexts of use 208 identify whether the procedure is used with technology that is paper-based (procedure is provided to personnel using printed documents) or electronic (procedure is provided to personnel using electronic devices).

The classification 206 and context(s) of use 208 for the procedure being defined are combined and used to identify one or more effective interaction techniques 210. The effective interaction techniques 210 represent techniques (whether in paper, electronic, or other form) used to ensure that personnel effectively execute or implement the procedure. For example, the effective interaction techniques 210 could be used to ensure that the appropriate personnel read, verify, and understand the procedure. The effective interaction techniques 210 could also be used to ensure that the procedure is executed accurately, efficiently, safely, and economically.

In this example, the various aspects of the effective interaction techniques 210 include procedure content (information describing the procedure), procedure structure (the presentation of the procedure), and navigation (ways a user follows the flow of the procedure and gains access to required information). The various aspects of the effective interaction techniques 210 also include procedure format (the arrangement or organization of the procedure) and terminology (the language used in the procedure). In addition, the various aspects of the effective interaction techniques 210 include status format (for a procedure, a step, or part of a step) and data entry (the ways to enter information for procedure steps).

The end result of the method 200 is an effective procedure 212, which is a procedure designed for a specific context of use. Information associated with the effective procedure 212 could be provided to a user in any suitable manner, such as in printed form or electronically. The effective interaction techniques 210 or the effective procedure 212 could vary depending on the user receiving the procedure-related information. For example, the information defining a procedure that is presented to a user using a console device may differ from the information defining the procedure that is presented to a user using a mobile device.

The following represents additional details regarding the method 200 of FIG. 2. These additional details are for illustration and explanation only. Other embodiments of the method 200 that operate in a different manner could be used without departing from the scope of this disclosure. As examples, the method 200 could be modified in any suitable manner, such as by making different assessments 204, using different classifications 206, identifying different contexts of use 208, or selecting different effective interaction techniques 210.

The first part of the method 200 may generally be referred to as procedure classification, which involves using the inputs 202 to make the various assessments 204 and select the appropriate classification 206. In some embodiments, a procedure may be classified using a risk-based approach. As described above, different assessments 204 are made of the risks associated with failing to perform a procedure as written, and these assessments 204 are used to classify the procedure. The assessments 204 may, for example, involve expert judgments from personnel associated with a particular facility in which the procedure can be performed. As particular examples, the assessments 204 may involve determinations as to the potential amount or severity of personnel injury, environmental release, and economic loss that could be associated with failing to follow a procedure. The assessments 204 may also involve determining the frequency at which a procedure is performed (procedures performed less frequently may generally require more support since personnel may be less familiar with the details of the procedure's execution). In addition, the assessments 204 may involve determining the complexity of a procedure (more complex procedures may generally provide more opportunities for breakdowns in execution of the procedures).

Once the appropriate classification 206 of a procedure is made, the appropriate contexts of use 208 of the procedure are determined. The contexts of use 208 include an operator role, which addresses the different needs of console and field operations. Console operations often occur within a control room or other location where operators have access to consoles with larger displays and can initiate actions on plant equipment wired to or otherwise in communication with the consoles. Field operators often move throughout a facility to perform various tasks, such as equipment monitoring and preventive maintenance. Field operators are typically more constrained in the amount of information that is available to them (such as when the field operators use mobile devices with small display screens, which makes it difficult to view large documents). Field operators also often rely on the console operators for coordination of activities and information. Table 1 outlines some of the differences in the needs between console and field operators based on the classification of a procedure.

TABLE 1

| Context of Use | In-Task | Review | Resource |
| --- | --- | --- | --- |
| Console | 1) Leading role in procedural execution 2) Initial response activity 3) Big picture view needed to understand global context 4) Time delay shorter for ability to execute step | 1) Leading role in procedural execution 2) Initial response activity 3) Big picture view needed to understand global context 4) Time delay shorter for ability to execute step 5) Time to review detail | 1) Lead procedure execution individually (inform others of tasks performed before and after they are executed) 2) Big picture view is available 3) Time to review detail |
| Field | 1) Supporting role in procedural execution 2) Activity after initial response 3) Need to know local dependencies on their actions and scheduling requirements 4) Time delay longer for ability to execute step | 1) Supporting role in procedural execution 2) Activity after initial response 3) Need to know local dependencies on their actions and scheduling requirements; have time to see big picture 4) Time delay longer for ability to execute step 5) Time to review detail | 1) Lead procedure execution individually (inform others of tasks performed before and after they are executed) 2) Big picture view is available 3) Time to review detail |

The classification of procedures into the classifications 206 also provides a basis for establishing practices for delivering procedures in written form or electronically. With the delivery of procedural content appropriate to the risk and conditions of use, these practices may help to minimize the impact of failing to execute a procedure as intended. Table 2 illustrates example user needs related to conditions of use associated with the three risk categories (complexity, frequency, and consequences) discussed above. These user needs may influence the selection of specific interaction techniques 210.

TABLE 2

| Context of Use | In-Task | Review | Resource |
| --- | --- | --- | --- |
| Consequence: Risk of Incident or Accident | High need for verification that steps complete need cautions/warnings need tracking mechanism on status, people, activity need constraint information (not to exceed limits) | Medium need to preview cautions/warnings need communication that steps are complete | Low need to know if activity has been completed |
| Consequence: Time Pressure | High (Emergency) initial elements need to be completed within 15 minutes remaining elements need to be done in few hours Medium-Low (Others) varies with the nature of the process | Medium-Low varies with nature of the process (typically try to complete within a shift) | Low none |
| Frequency | Low-High need reminder or refresher depending on frequency | Low-High need reminder or refresher depending on frequency | Low-High need reminder or refresher depending on frequency |
| Complexity: Length | Medium-High need tracking mechanism for status, people, activity need reminder (overview - big picture) need to see dependencies between actions | Low-High need tracking mechanism for status, people, activity need reminder (overview - big picture) need to see dependencies between actions | Low assume no shift change |

TABLE 2-continued

| Context of Use | In-Task | Review | Resource |
|---|---|---|---|
| Complexity: Cognitive Workload | Medium-High may need automation support need well-designed displays to support activities need tracking mechanism for status, people, activity | Medium-High may need automation support need well-designed displays to support activities need tracking mechanism for status, people, activity | Low none |
| Complexity: Physical Workload | Low-High need good understanding of facility layout or display organization to minimize unnecessary movements need to look ahead at upcoming steps to plan efficient execution | Low-High need good understanding of facility layout or display organization to minimize unnecessary movements need to look ahead at upcoming steps to plan efficient execution | Low-High need good understanding of facility layout or display organization to minimize unnecessary movements need to look ahead at upcoming steps to plan efficient execution |
| Complexity: Coordination Requirements | High need to communicate with other disciplines in addition to own team need for automation support to communications need tracking mechanism for status, people, activity | Medium need to communicate within own team need to preview who does what need to track completion of steps | Low need to know activity started and completed |

Once the appropriate classification 206 and contexts of use 208 of a procedure are determined, one or more effective interaction techniques 210 for the procedure are identified. These techniques 210 may be used to ensure that procedure-related information is provided to personnel in an appropriate manner given factors such as the context of use 208 (for example, whether a field operator or console operator has requested the information).

When designing a mechanism for effective interaction with a procedure, a number of content and form options may be considered and selected based on the procedure classification 206 and the context(s) of use 208. The content and form options may include procedure content, procedure structure, navigation, procedure format, terminology, status format, and data entry.

The classification 206 and contexts of use 208 may determine the procedure content to be provided to personnel requesting information about a procedure. For example, in a time-pressure situation, personnel may not have time to read large amounts of detail regarding a procedure. Key steps could be salient so they are not missed, and checklists may be useful here. As another example, it is often difficult to read and scroll text describing a procedure on a handheld mobile device (compared with text presented on paper or a console display), so the content provided to the user may differ depending on the platform being used by the user.

In particular embodiments, the procedure content may include information such as the steps or actions of a procedure, the number of steps or actions, and notes, cautions, warnings, and hazards associated with the procedure. The procedure content could also include related non-procedural information, such as document information (document type, revision number, revision date, author, and reviewer), background, purpose, and related references.

The classification 206 and contexts of use 208 may also determine the structure of a procedure (how procedure-related information is provided to personnel requesting information about a procedure). In particular embodiments, a procedure could have a hierarchical organization or a flat organization. A hierarchical organization divides the procedure into manageable pieces or modules. This may make it easier for an operator to scan, understand, and remember the procedure. A flat organization keeps the steps of a procedure at one level. This may work better for shorter procedures or checklists where operators can quickly navigate to the required steps without going through a hierarchical structure, and interdependencies among steps can be readily shown.

The classification 206 and contexts of use 208 may further determine the navigation techniques available to personnel requesting information about a procedure. The ability to easily navigate within and across procedures may minimize user error, minimize user frustration, and decrease the overall time for executing the procedures. Different types of navigation could be available for use by personnel requesting procedure-related information. For example, global navigation may provide a broad sweep of an entire procedure and bring together access points that operators may use to move from one part of the procedure to another. Local navigation may provide access to procedure steps and related information associated with what the operators are currently doing (such as providing access to parent, sibling, and children modules of the current module being executed in a hierarchically arranged procedure). Supplementary navigation may provide shortcuts to related content not readily accessible through global or local navigation. Contextual navigation may be embedded in the content of a procedure or step and include hyperlinks to supporting information. Courtesy navigation may provide access to information users do not need on a regular basis but that is provided as a convenience.

Specific forms of navigation could be provided to operators to navigate the procedure content. These include an overview navigation map, which provides high-level procedure structure information and graphics (such as nodes or icons) that can be selected to display associated procedural details or instructions. Operators can see how the nodes or icons relate to each other and can navigate to various parts of the procedure. Scrolling (where a user uses a scroll bar or "page up" and "page down" buttons) and tabs (where a procedure is organized into different sections accessed by tabs) could also be used. In addition, hierarchical links (used to navigate a hierarchical organization of a procedure), hypertext/hyperlinks, and menus could be used to navigate procedure content.

The classification 206 and contexts of use 208 may also determine the format of procedure-related information provided to personnel requesting information about a procedure. For example, a procedure could be formatted using sections and headings, where sections of the procedure content are labeled using section headings. This format may typically be used with paper-based procedures. A procedure could also be formatted as a checklist, which provides a short list of procedure steps that are typically checked off once completed. A procedure could further be formatted as an overview flowchart, or a graphical flowchart that conveys the global structure of the procedure with step flow and dependencies. In addition, a procedure could be formatted as a "by memory" procedure. This format may require that operators memorize at least some of the procedure steps, such as the first few steps of the procedure. In certain cases (such as emergencies), operators may not have time to look up a checklist or regularly formatted procedure, so the operators may memorize a small number of steps (such as five to nine steps). The number of memorized steps is typically small, and the number of procedures requiring memorization of steps is typically small. This helps to reduce the likelihood of operator error, such as forgetting a step or confusing steps from different memorized procedures.

The classification 206 and contexts of use 208 may further determine the terminology of the procedure-related information provided to personnel requesting information about a procedure. For example, the terminology could include plain language with known reference items, where full explanations provide greater detail about the required tasks of a procedure, any associated references, and any cautions, warnings, or other notes. The terminology could also include short direct language, where short descriptors and symbols are used to convey a procedure or checklist step to reduce the space and time needed to use the information.

Beyond that, the classification 206 and contexts of use 208 may determine the status format to be used in procedure-related information provided to personnel requesting information about a procedure. The status format identifies how the status of a procedure, step, or part thereof is conveyed. For example, a text message or brief descriptor could be used to identify the status of a procedure or step. An overview could provide a high-level diagram or structure showing the status of different parts of the procedure, as well as alarms, alerts, and messages. Symbols or icons could convey the status of a step, activity, outcome, or procedure state. Graphics and figures could be used to show activities or dynamic variables. Photos and video could provide direct display of remote locations and can be used to verify steps and states. Color (with any of the items noted above) can be used to effectively convey the status or importance of information.

In addition, the classification 206 and contexts of use 208 may determine the data entry used with the procedure being requested by personnel. Various data entry devices or techniques could be used with a procedure. For example, automatic data entry could occur using devices such as data collection probes or sensors. Automatic calculations on variables of interest in the procedure could also be done to generate necessary data. Further, input devices such as a stylus could be used to allow an operator to enter information manually or to select appropriate responses from a form-based widget (such as a drop-down box). In addition, a keyboard could be used by an operator to type in the required information.

Once the effective interaction techniques 210 are identified, an effective procedure 212 is produced for a specific context of use, where the effective procedure 212 is provided to the personnel requesting a procedure. The effective procedures 212 provided to different personnel could vary, even if the effective procedures 212 relate to the same general procedure. The effective procedures 212 could vary, for example, depending on the context of use 208 (such as when one operator is a console operator and another operator is a field operator). In some embodiments, different delivery options could be used to provide the effective procedures 212 to the appropriate personnel. These delivery options include paper-based delivery, on-line static delivery, on-line interactive delivery, and on-line hybrid delivery.

Figure 3A:
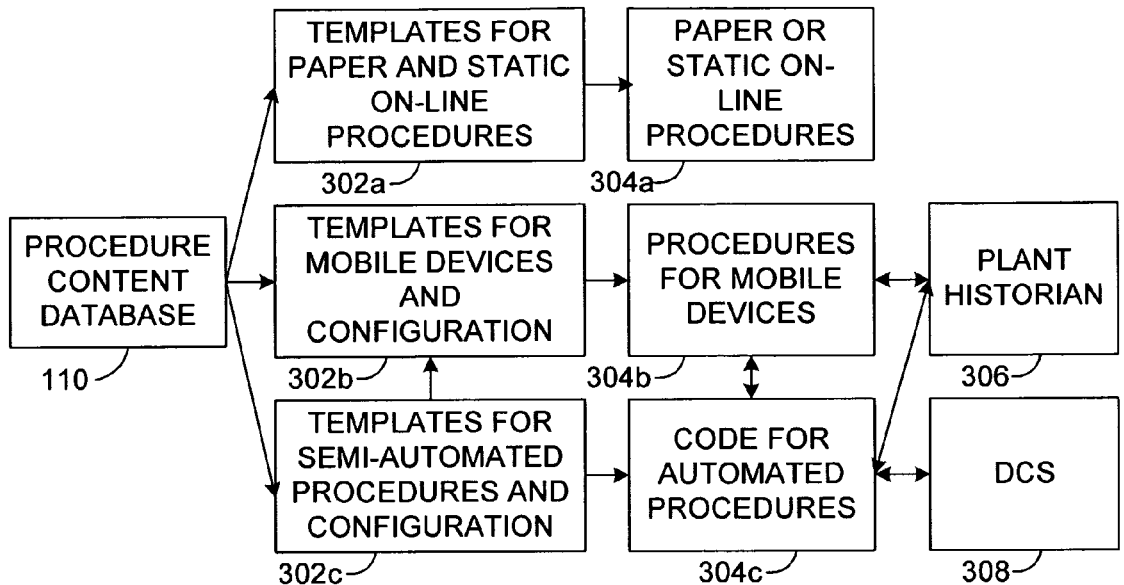
FIGS. 3A and 3B illustrate example databases for storage and distribution of procedure-related information according to one embodiment of this disclosure.
Figure 3B:
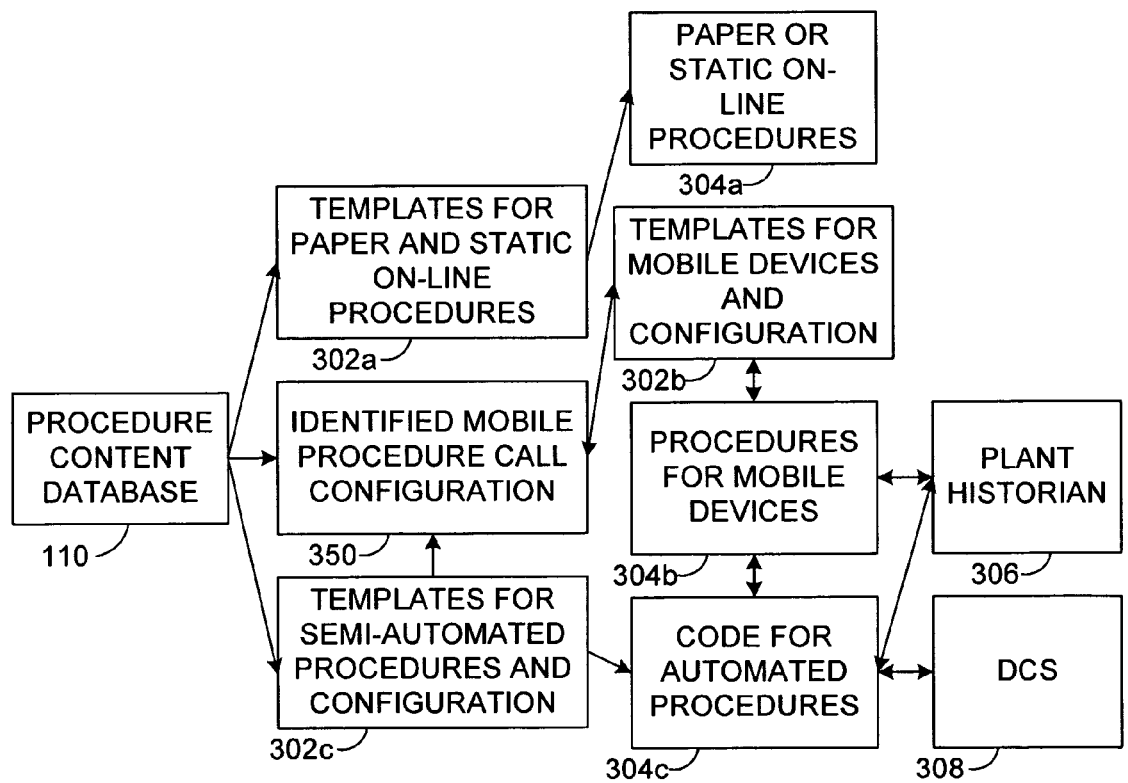

Examples of the storage and distribution of procedure-related information in the database 110 are shown in FIGS. 3A and 3B. In particular, FIG. 3A illustrates the use of a centralized database, and FIG. 3B illustrates the use of a distributed database. With the centralized database 110 shown in FIG. 3A, procedure-related content and information for configuring a procedure are entered at one source location (server 108). The information for configuring a procedure could be received by having a user check off items to be shown on paper, console, or mobile devices. This may be done, for example, using an application executed on the server 108.

Templates 302a-302c are used to format procedure-related information from the database 110 for presentation to users using the user devices 102. Each of the templates 302a-302c may format information associated with a different type of procedure or platform. For example, one or more templates 302a may be used to format information associated with paper-based or static on-line procedures. One or more templates 302b may be used to format information associated with procedures for mobile devices. One or more templates 302c may be used to format information associated with semi-automated procedures. Semi-automated procedures represent procedures that are partially implemented using programming code. The particular template used to format a specific procedure may be chosen based on the procedure type, the implementation medium, and the context of use of the procedure.

The templates 302a-302c are used to provide procedures 304a-304c, respectively, to users. For example, procedures 304a represent procedures provided in paper-based form (printed onto paper) or static on-line form (viewed electronically using console computers or other devices). Procedures 304b represent procedures for mobile devices, which may be configured for use with devices having small display screens (making it difficult to present large amounts of information) or limited input/output functionality (meaning specialized navigation functions are needed). Procedures 304c represent programming code for semi-automated procedures.

The paper-based procedures 304a are generally made available to personnel in an organization for printing. The static on-line procedures 304a are generally made available in electronic form to personnel in the organization when requested. The procedures 304b for mobile devices are generally made available to mobile devices when needed. The procedures 304b may also interact with the procedures 304c to implement any necessary automated functionality required by the procedures 304b. The procedures 304b may further interact with a plant historian 306, which archives information about the procedures 304b (such as who invoked the procedures 304b and the interactions with the procedures 304c). The procedures 304c may interact with the procedures 304b, the plant historian 306, and a distributed control system 308. The distributed control system 308 represents a control system capable of performing the functions implemented or invoked by the procedures 304c.

As shown in FIG. 3B, the use of a distributed database 110 could also be supported in the system 100. This may be useful, for example, when existing infrastructure at a facility requires a distributed database arrangement, where a primary database calls procedures in other database(s). In this example, the procedures 304b for mobile devices can be accessed via a database 350, which provides access to a procedure 304b using an identified procedure call configuration. In this way, procedures may be linked and called upon as appropriate. Templates 304a-304c could still be used for each delivery option and procedure type.

The following represents particular details of how procedures in the database 110 may be formatted and presented to different platforms. These particular details are for illustration and explanation only and are not meant to limit the scope of this disclosure. In the following description, the procedures may be provided to personnel using paper-based delivery, on-line static delivery, on-line interactive delivery, or on-line hybrid delivery.

Paper-based procedures are often delivered by printing procedure-related information from the database 110 and placing the printed documents in a binder. Table 3 illustrates how non-procedural content retrieved from the database 110 can be formatted for printing based on the different classifications 206 of procedures.

TABLE 3

| Non-Procedure Content Item | In-task | Review | Resource |
|---|---|---|---|
| Document Info: Procedure Type | Written clearly on all pages and cues in subsequent pages | Written clearly on all pages and cues in subsequent pages | Written clearly all pages and cues in subsequent pages |
| Document Info: Process Unit or Area | Document info section; tab | Document info section; tab | Document info section; tab |
| Document Info: Revision Info (Date, #) | Supplementary information | Supplementary information | Supplementary information |
| Document Info: Procedure Reference # | All pages | All pages | All pages |
| Document Info: Number of Pages | All pages | All pages | All pages |
| Document Info: Procedure Author | Supplementary information | Supplementary information | Supplementary information |
| Document Info: Procedure Reviewers | Supplementary information; may not be needed | Supplementary information | Supplementary information |
| Document Info: Title | All pages | All pages | All pages |
| General Info: Objective (purpose, desired results, how actions create desired results) | Beginning | Beginning | Beginning |
| General Info: Safety Precautions (safe work guidelines, special equipment, hazards, environmental concerns, MSDS) | Beginning | Beginning | Beginning |
| General Info: Prerequisites to Execution (tasks to complete, required equipment or process conditions) | Beginning | Beginning | Beginning |
| General Info: Restrictions or Constraints (process or equipment limitations) | Beginning or before step | Beginning or before step | Beginning or before step |
| Supporting Info: Illustrations (drawings or enhanced images to support actions) | End; or point to reference docs | End; or point to reference docs | End; or point to reference docs |
| Supporting Info: References (related procedures, related documents: MOC | Pointer to docs | Pointer to docs | Pointer to docs |

TABLE 3-continued

| Non-Procedure Content Item | In-task | Review | Resource |
|---|---|---|---|
| deviations, operating manuals, MSDS, key process variables) | | | |
| Supporting Info: Appendices (troubleshooting guide, explanatory materials) | End | End | End |

Table 4 illustrates how procedural content retrieved from the database 110 can be formatted for printing based on the different classifications 206 of procedures.

TABLE 4

| Procedure Content Item | In-task | Review | Resource |
|---|---|---|---|
| Procedure Instruction: Step or Action # | At step | At step | At step |
| Procedure Instruction: Step Description | Yes | Yes | Yes |
| Procedure Instruction: Action Description | No; but access to it | Yes | Yes |
| Procedure Instruction: Notes | Minimize | Depends, maybe at step | Depends, maybe at step |
| Procedure Instruction: Cautions | Before step | Before step | Before step |
| Procedure Instruction: Warnings | Before step | Before step | Before step |
| Procedure Instruction: Hazards (per HAZOP) | Before step | Before step | Before step |
| Procedure Instruction: Role responsible for step or action | Indicate as different column beside step; use of color | Indicate as different column beside step; use of color | Indicate as different column beside step; use of color |
| Procedure Instruction: Change process or equipment to specific state or condition | Within step instruction; use direct language | Within step instruction; use direct language | Within step instruction; use direct language |
| Procedure Instruction: Verify process or equipment condition exists | Within step instruction; use direct language | Within step instruction; use direct language | Within step instruction; use direct language |
| Procedure Instruction: Check for malfunction or abnormal condition | Within step instruction; use direct language | Within step instruction; use direct language | Within step instruction; use direct language |
| Procedure Instruction: Obtain resource for future step | Within step instruction; use direct language | Within step instruction; use direct language | Within step instruction; use direct language |
| Procedure Instruction: Notify a specific location or job position | Within step instruction; use direct language | Within step instruction; use direct language | Within step instruction; use direct language |
| Procedure Instruction: Obtain information from specific location or job position | Within step instruction; use direct language | Within step instruction; use direct language | Within step instruction; use direct language |
| Procedure Documentation: Step or Action Sign off | Yes | Maybe | No |
| Procedure Documentation: Step or Action Check-off | Yes | Maybe | Maybe |
| Procedure Documentation: Signature on completed procedure | At end | At end | Logbook |
| Procedure Documentation: Record step completion time | Yes if time | Yes at step | Not required |
| Procedure Documentation: Record process condition or data associated with step or action completion | At step | At step | At step/data logsheet |

Table 5 illustrates the various interaction techniques 210 available for paper-based procedures based on the different classifications 206 of procedures.

TABLE 5

| Interaction | In-Task | Review | Resource |
|---|---|---|---|
| Procedure Structure | 1 level (flat), but access to other levels; abbreviated version of procedure | 2 levels | 2 levels |
| Navigation to Procedure | Quick access; at console, intranet | In binder, use of tabs, or intranet | In binder, use of tabs, or intranet |
| Navigation between steps and other items | None, should be direct and sequential | Overview map; section headings | Overview map; section headings |
| Procedure Format | Memory (emergency), checklist | Checklist and $1^{st}/2^{nd}$ level action descriptions; flowchart if there are complex dependencies FIELD: Use of checklists or logsheets; take out relevant parts of the procedure | Checklist and $1^{st}/2^{nd}$ level action descriptions; flowchart if there are complex dependencies FIELD: Use of checklists or logsheets |
| Terminology | Short; direct; use of standard vocabulary; set number of terms used in consistent way; no ambiguity in verb action | Short; direct; use of standard vocabulary; set number of terms used in consistent way; no ambiguity in verb action | Short; direct; use of standard vocabulary; set number of terms used in consistent way; no ambiguity in verb action |
| Status Format | Checkoffs/signoffs; data values at instruction or summary area | Checkoffs/signoffs; data values at instruction or summary area | Checkoffs; data values at instruction or summary area, logsheet |
| Data Entry | Pen | Pen | Pen |

The language and terms used in procedures (including paper-based procedures) may be consistent across all media. The language may be as short and direct as possible with no ambiguity for qualified personnel, and facility or organization conventions may be used when designing procedures. Each lowest-level step of a procedure could be limited to one action plus any associated conditional statements. Bold or other character differentiators may be used for salience (such as bolding action terms), and text should be easily readable.

Paper-based procedures may have different organizations depending on the practices of individual facilities or organizations. Also, many paper-based procedures are performed sequentially, although deviations from the sequence are possible, and other options include steps done in any order, simultaneously, when preconditions are met, or after branching. Overview maps may be used for more complex interactions. Hierarchical paper-based procedures often have two levels, a higher level and a lower level with more detail. Section headings and indentations may be used to clearly differentiate levels, or multiple columns could be used to differentiate levels. Paper-based procedures can be formatted in any suitable manner, such as by using text descriptions, icon symbols, and overview diagrams (such as fish-bone diagrams). Overview diagrams may be useful, for example, when the number of level steps is high (such as 5-10 steps or more), there are complex dependencies, multiple procedures are tied together, timing and coordination issues exist, or there is a need to show timing issues and coordination.

Paper-based procedures often include places in the procedures to show roles associated with various coordination requirements. This may be shown as a column beside procedure steps. Text fields for outlining who is responsible for performing an action and/or visual coding (such as color) to distinguish different roles could be used. A "pocket checklist" (short checklist) could also be used to provide information about required roles. Paper-based procedures could also include locations for "checkoffs" (indications that steps are complete) and "signoffs" (approvals from appropriate personnel). Signoffs may be necessary for actions that have high consequences if not performed properly or that need validation. Signoffs could, for example, be used for individual steps of an in-task procedure or for an entire review procedure. The status of individual steps in a paper-based procedure could be updated using checkoffs and signoffs, state information may be entered into appropriate fields in paper documents, and calculations are often performed manually. Any warnings (such as warnings of personal injury) or cautions (such as cautions of equipment damage) may appear before a particular step or procedure section. Warnings and cautions may be distinguishable visually, such as by using double borders for warnings, single borders for cautions, and/or colors and symbols. Supporting material may be placed at the end of a paper-based procedure for reference. If it is difficult to access supplementary information and that information does not change frequently, a copy of the information could be included with the paper-based procedure itself.

The above description may be more specific to paper-based procedures used in the console context of use 208. In the field context of use 208, paper-based procedures (such as review and resource procedures) may simply include a checklist that is more convenient for use than a console paper-based procedure.

Static on-line procedures are typically delivered electronically to consoles and other computing devices from the database 110. Static on-line procedures may be in any electronic form, such as MICROSOFT WORD documents or ADOBE PDF files that can be browsed and reviewed. Static on-line procedures are typically navigated using hyperlinks and cues.

The requirements for static on-line procedures may be the same as or similar to the requirements for paper-based procedures (except that navigation is electronic). Documentation and supplementary information may be provided through, for example, hypertext or "right-mouse click" functionality. In addition, information can be typed in and saved. Table 6 illustrates how non-procedural content retrieved from the database 110 can be formatted for static on-line delivery based on the different classifications 206 of procedures.

TABLE 6

| Non-Procedure Content Item | In-task | Review | Resource |
|---|---|---|---|
| Document Info: Procedure Type | Clearly visible on all pages and cues in subsequent pages | Clearly visible on all pages and cues in subsequent pages | Clearly visible on all pages and cues in subsequent pages |
| Document Info: Process Unit or Area | Document info section; tab | Document info section; tab | Document info section; tab |
| Document Info: Revision Info (Date, #) | Supplementary information; Document info section; tab | Supplementary information; Document info section; tab | Supplementary information; Document info section; tab |
| Document Info: Procedure Reference # | Document info section; tab | Document info section; tab | Document info section; tab |
| Document Info: Number of Pages | # steps; pages may not be relevant for online version | # steps; pages may not be relevant for online version | # steps; pages may not be relevant for online version |
| Document Info: Procedure Author | Supplementary information; Document info section; tab | Supplementary information; Document info section; tab | Supplementary information; Document info section; tab |
| Document Info: Procedure Reviewers | Supplementary information; may not be needed | Supplementary information; Document info section; tab | Supplementary information; Document info section; tab |
| Document Info: Title | All pages | All pages | All pages |
| General Info: Objective (purpose, desired results, how actions create desired results) | Beginning; general info tab | Beginning; general info tab | Beginning; general info tab |
| General Info: Safety Precautions (safe work guidelines, special equipment, hazards, environmental concerns, MSDS) | Beginning; general info tab | Beginning; general info tab | Beginning; general info tab |
| General Info: Prerequisites to Execution (tasks to complete, required equipment or process conditions) | Beginning; general info tab | Beginning; general info tab | Beginning; general info tab |
| General Info: Restrictions or Constraints (process or equipment limitations) | Beginning; general info tab; before step | Beginning; general info tab; before step | Beginning; general info tab; before step |
| Supporting Info: Illustrations (drawings or enhanced images to support actions) | Hypertext links | Hypertext links | Hypertext links |
| Supporting Info: References (related procedures, related documents: MOC deviations, operating manuals, MSDS, key process variables) | Hypertext links | Hypertext links | Hypertext links |
| Supporting Info: Appendices (troubleshooting guide, explanatory material) | Hypertext links; tabs | Hypertext links; tabs | Hypertext links; tabs |

Table 7 illustrates how procedural content retrieved from the database 110 can be formatted for static on-line delivery based on the different classifications 206 of procedures.

TABLE 7

| Procedure Content Item | In-task | Review | Resource |
|---|---|---|---|
| Procedure Instruction: Step or Action # | At step | At step | At step |
| Procedure Instruction: Step Description | Yes | Yes | Yes |
| Procedure Instruction: Action Description | No; but access to it | Yes | Yes |
| Procedure Instruction: Notes | Minimize | Depends, maybe at step | Depends, maybe at step |
| Procedure Instruction: Cautions | Before step | Before step | Before step |
| Procedure Instruction: Warnings | Before step | Before step | Before step |
| Procedure Instruction: Hazards (per HAZOP) | Before step | Before step | Before step |
| Procedure Instruction: Role responsible for step or action | Indicate as different column beside step; use of color | Indicate as different column beside step; use of color | Indicate as different column beside step; use of color |
| Procedure Instruction: Change process or equipment to specific state or condition | Within step instruction; use direct language | Within step instruction; use direct language | Within step instruction; use direct language |
| Procedure Instruction: Verify process or equipment condition exists | Within step instruction; use direct language | Within step instruction; use direct language | Within step instruction; use direct language |
| Procedure Instruction: Check for malfunction or abnormal condition | Within step instruction; use direct language | Within step instruction; use direct language | Within step instruction; use direct language |
| Procedure Instruction: Obtain resource for future step | Within step instruction; use direct language | Within step instruction; use direct language | Within step instruction; use direct language |
| Procedure Instruction: Notify a specific location or job position | Within step instruction; use direct language | Within step instruction; use direct language | Within step instruction; use direct language |
| Procedure Instruction: Obtain information from specific location or job position | Within step instruction; use direct language | Within step instruction; use direct language | Within step instruction; use direct language |
| Procedure Documentation: Step or Action Sign off | Yes | Maybe | No |
| Procedure Documentation: Step or Action Check-off | Yes | Maybe | Maybe |
| Procedure Documentation: Signature on completed procedure | At end | At end | Maybe |
| Procedure Documentation: Record step completion time | Yes if time | Yes at step | Not required |
| Procedure Documentation: Record process condition or data associated with step or action completion | At step | At step | At step |

Table 8 illustrates the various interaction techniques 210 available for static on-line procedures based on the different classifications 206 of procedures.

TABLE 8

| Interaction | In-Task | Review | Resource |
|---|---|---|---|
| Procedure Structure | 1 level (flat) | 2 levels | 2 levels |
| Navigation to Procedure | Quick access; at console, intranet | intranet | intranet |
| Navigation between | None, should be | Overview map; | Overview map; section |

TABLE 8-continued

| Interaction | In-Task | Review | Resource |
|---|---|---|---|
| steps and other items | direct and sequential | section headings; tabs | headings; tabs |
| Procedure Format | Memory, checklist | Checklist and 1$^{st}$/2$^{nd}$ level action descriptions; flowchart if there are complex dependencies | Checklist and 1$^{st}$/2$^{nd}$ level action descriptions; flowchart if there are complex dependencies |
| Terminology | Short, direct | Short, direct | Short, direct |
| Status Format | Checkoffs/signoffs; data values at instruction or summary area | Checkoffs/signoffs; data values at instruction or summary area | Checkoffs; data values at instruction or summary area |
| Data Entry | Stylus, keyboard; input devices, calculated | Stylus, keyboard; input devices, calculated | Stylus, keyboard; input devices, calculated |

The above description may be more specific to static on-line procedures used in the console context of use 208. In the field context of use 208, field personnel may have handheld computers or other small mobile devices for viewing and entering information, thereby limiting what the personnel can view and enter. Supplementary information could be accessed with different tabs, and the checklist format may be the most feasible or useful. Second-level action descriptions, notes, and other information could be accessed by a details screen, and automated input devices in the field may be preferable or desirable if keyboards are awkward to use.

Interactive on-line procedures are typically delivered electronically to consoles and other computing devices from the database 110. Interactive on-line procedures may represent procedures that are updated using information from the plant historian 306, and automated workflows may be capable of handling exceptions that arise during execution of the procedures. Interactive on-line procedures are typically navigated using hyperlinks and cues. Status updates can be received from the system 100, any necessary calculations can be made by the system 100, and signoffs and checkoffs can be made electronically and tracked. Branching and exception handling could be driven by manual actions and checkoffs, and potential troubleshooting support can be obtained by showing activity and state information. Many of the requirements for interactive on-line procedures may be the same as or similar to the requirements for static on-line procedures, although several enhancements to aid in procedure execution can be made. For example, status information about the procedure and the process of executing the procedure may be available to an operator. Also, the status can be automatically updated based on checkoffs or signoffs, and any preconditions can be assessed automatically based on the status. In addition, data can be entered and calculations can be made automatically, and the distributed control system 308 could be integrated for a particular action. Table 9 illustrates how non-procedural content retrieved from the database 110 can be formatted for interactive on-line delivery based on the different classifications 206 of procedures.

TABLE 9

| Non-Procedure Content Item | In-task | Review | Resource |
|---|---|---|---|
| Document Info: Procedure Type | Clearly visible on all pages and cues in subsequent pages | Clearly visible on all pages and cues in subsequent pages | Clearly visible on all pages and cues in subsequent pages |
| Document Info: Process Unit or Area | Document info section; tab | Document info section; tab | Document info section; tab |
| Document Info: Revision Info (Date, #) | Supplementary information; Document info section; tab | Supplementary information; Document info section; tab | Supplementary information; Document info section; tab |
| Document Info: Procedure Reference # | Document info section; tab | Document info section; tab | Document info section; tab |
| Document Info: Number of Pages | # steps; pages may not be relevant for online version | # steps; pages may not be relevant for online version | # steps; pages may not be relevant for online version |
| Document Info: Procedure Author | Supplementary information; Document info section; tab | Supplementary information; Document info section; tab | Supplementary information; Document info section; tab |
| Document Info: Procedure Reviewers | Supplementary information; may not be needed | Supplementary information; Document info section; tab | Supplementary information; Document info section; tab |

TABLE 9-continued

| Non-Procedure Content Item | In-task | Review | Resource |
|---|---|---|---|
| Document Info: Title | All pages | All pages | All pages |
| General Info: Objective (purpose, desired results, how actions create desired results) | Beginning; general info tab | Beginning; general info tab | Beginning; general info tab |
| General Info: Safety Precautions (safe work guidelines, special equipment, hazards, environmental concerns, MSDS) | Beginning; general info tab | Beginning; general info tab | Beginning; general info tab |
| General Info: Prerequisites to Execution (tasks to complete, required equipment or process conditions) | Beginning; general info tab | Beginning; general info tab | Beginning; general info tab |
| General Info: Restrictions or Constraints (process or equipment limitations) | Beginning; general info tab; before step | Beginning; general info tab; before step | Beginning; general info tab; before step |
| Supporting Info: Illustrations (drawings or enhanced images to support actions) | Hypertext links | Hypertext links | Hypertext links |
| Supporting Info: References (related procedures, related documents: MOC deviations, operating manuals, MSDS, key process variables) | Hypertext links | Hypertext links | Hypertext links |
| Supporting Info: Appendices (troubleshooting guide, explanatory material) | Hypertext links; tabs | Hypertext links; tabs | Hypertext links; tabs |

Table 10 illustrates how procedural content retrieved from the database 110 can be formatted for interactive on-line delivery based on the different classifications 206 of procedures.

TABLE 10

| Procedure Content Item | In-task | Review | Resource |
|---|---|---|---|
| Procedure Instruction: Step or Action # | At step | At step | At step |
| Procedure Instruction: Step Description | Yes | Yes | Yes |
| Procedure Instruction: Action Description | No; but access to it | Yes | Yes |
| Procedure Instruction: Notes | Minimize | Depends, maybe at step | Depends, maybe at step |
| Procedure Instruction: Cautions | Before step | Before step | Before step |
| Procedure Instruction: Warnings | Before step | Before step | Before step |
| Procedure Instruction: Hazards (per HAZOP) | Before step | Before step | Before step |
| Procedure Instruction: Role responsible for step or action | Indicate as different column beside step; use of color | Indicate as different column beside step; use of color | Indicate as different column beside step; use of color |
| Procedure Instruction: Change process or equipment to specific state or condition | Within step instruction; use direct language | Within step instruction; use direct language | Within step instruction; use direct language |

TABLE 10-continued

| Procedure Content Item | In-task | Review | Resource |
|---|---|---|---|
| Procedure Instruction: Verify process or equipment condition exists | Within step instruction; use direct language | Within step instruction; use direct language | Within step instruction; use direct language |
| Procedure Instruction: Check for malfunction or abnormal condition | Within step instruction; use direct language | Within step instruction; use direct language | Within step instruction; use direct language |
| Procedure Instruction: Obtain resource for future step | Within step instruction; use direct language | Within step instruction; use direct language | Within step instruction; use direct language |
| Procedure Instruction: Notify a specific location or job position | Within step instruction; use direct language | Within step instruction; use direct language | Within step instruction; use direct language |
| Procedure Instruction: Obtain information from specific location or job position | Within step instruction; use direct language | Within step instruction; use direct language | Within step instruction; use direct language |
| Procedure Documentation: Step or Action Sign off | Yes | Maybe | No |
| Procedure Documentation: Step or Action Check-off | Yes | Maybe | Maybe |
| Procedure Documentation: Signature on completed procedure | At end | At end | Maybe |
| Procedure Documentation: Record step completion time | Yes if time | Yes at step | Not required |
| Procedure Documentation: Record process condition or data associated with step or action completion | At step; could be automatically entered | At step; could be automatically entered | At step; could be automatically entered |

Table 11 illustrates the various interaction techniques 210 available for interactive on-line procedures based on the different classifications 206 of procedures.

TABLE 11

| Interaction | In-Task | Review | Resource |
|---|---|---|---|
| Procedure Structure | 1 level (flat) | 2 levels | 2 levels |
| Navigation to Procedure | Quick access; at console, intranet | intranet | In binder or intranet |
| Navigation between steps and other items | None, should be direct and sequential | Overview map; section headings; tabs | Overview map; section headings; tabs |
| Procedure Format | Memory, checklist | Checklist and $1^{st}/2^{nd}$ level action descriptions; flowchart if there are complex dependencies | Checklist and $1^{st}/2^{nd}$ level action descriptions; flowchart if there are complex dependencies |
| Terminology | Short, direct, abbreviated | Short, direct | Short, direct |
| Status Format | Checkoffs/signoffs; data values at instruction or summary area; dependencies shown, status of procedure: words icons, color | Checkoffs/signoffs; data values at instruction or summary area; dependencies shown, status of procedure: words icons, color | Checkoffs; data values at instruction or summary area; dependencies shown, status of procedure: words icons, color |
| Data Entry | Stylus, keyboard; input devices, calculated | Stylus, keyboard; input devices, calculated | Stylus, keyboard; input devices, calculated |

The above description may be more specific to interactive on-line procedures used in the console context of use 208. In the field context of use 208, field personnel may have hand-held computers or other small mobile devices for viewing and entering information, thereby limiting what the personnel can view and enter. Supplementary information could be accessed with different tabs, and the checklist format may be the most feasible or useful. Second-level action descriptions, notes, and other information could be accessed by a details screen, and automated input devices in the field may be preferable or desirable if keyboards are awkward to use.

Hybrid on-line procedures are typically delivered electronically to consoles and other computing devices from the database 110. Hybrid on-line procedures may represent procedures that provide feedback on the status of the procedures and that can execute actions automatically or when initiated by an operator. This may help to provide consistent execution of action steps and to automatically check preconditions before actions are performed. Table 12 illustrates how non-procedural content retrieved from the database 110 can be formatted for hybrid on-line delivery based on the different classifications 206 of procedures.

TABLE 12

| Non-Procedure Content Item | In-task | Review | Resource |
|---|---|---|---|
| Document Info: Procedure Type | Clearly visible on all pages and cues in subsequent pages | Clearly visible on all pages and cues in subsequent pages | Clearly visible on all pages and cues in subsequent pages |
| Document Info: Process Unit or Area | Document info section; tab | Document info section; tab | Document info section; tab |
| Document Info: Revision Info (Date, #) | Supplementary information; Document info section; tab | Supplementary information; Document info section; tab | Supplementary information; Document info section; tab |
| Document Info: Procedure Reference # | Document info section; tab | Document info section; tab | Document info section; tab |
| Document Info: Number of Pages | # steps; pages may not be relevant for online version | # steps; pages may not be relevant for online version | # steps; pages may not be relevant for online version |
| Document Info: Procedure Author | Supplementary information; Document info section; tab | Supplementary information; Document info section; tab | Supplementary information; Document info section; tab |
| Document Info: Procedure Reviewers | Supplementary information; may not be needed | Supplementary information; Document info section; tab | Supplementary information; Document info section; tab |
| Document Info: Title | All pages | All pages | All pages |
| General Info: Objective (purpose, desired results, how actions create desired results) | Beginning; general info tab | Beginning; general info tab | Beginning; general info tab |
| General Info: Safety Precautions (safe work guidelines, special equipment, hazards, environmental concerns, MSDS) | Beginning; general info tab | Beginning; general info tab | Beginning; general info tab |
| General Info: Prerequisites to Execution (tasks to complete, required equipment or process conditions) | Beginning; general info tab | Beginning; general info tab | Beginning; general info tab |
| General Info: Restrictions or Constraints (process or equipment limitations) | Beginning; general info tab; before step | Beginning; general info tab; before step | Beginning; general info tab; before step |
| Supporting Info: Illustrations (drawings or enhanced images to support actions) | Hypertext links | Hypertext links | Hypertext links |
| Supporting Info: References (related procedures, related documents: MOC deviations, operating manuals, MSDS, key process variables) | Hypertext links | Hypertext links | Hypertext links |
| Supporting Info: Appendices (troubleshooting guide, explanatory material) | Hypertext links; tabs | Hypertext links; tabs | Hypertext links; tabs |

Table 13 illustrates how procedural content retrieved from the database 110 can be formatted for hybrid on-line delivery based on the different classifications 206 of procedures.

TABLE 13

| Procedure Content Item | In-task | Review | Resource |
|---|---|---|---|
| Procedure Instruction: Step or Action # | At step | At step | At step |
| Procedure Instruction: Step Description | Yes | Yes | Yes |
| Procedure Instruction: Action Description | No; but access to it | Yes | Yes |
| Procedure Instruction: Notes | Minimize | Depends, maybe at step | Depends, maybe at step |
| Procedure Instruction: Cautions | Before step | Before step | Before step |
| Procedure Instruction: Warnings | Before step | Before step | Before step |
| Procedure Instruction: Hazards (per HAZOP) | Before step | Before step | Before step |
| Procedure Instruction: Role responsible for step or action | Indicate as different column beside step; use of color | Indicate as different column beside step; use of color | Indicate as different column beside step; use of color |
| Procedure Instruction: Change process or equipment to specific state or condition | Within step instruction; use direct language | Within step instruction; use direct language | Within step instruction; use direct language |
| Procedure Instruction: Verify process or equipment condition exists | Within step instruction; use direct language | Within step instruction; use direct language | Within step instruction; use direct language |
| Procedure Instruction: Check for malfunction or abnormal condition | Within step instruction; use direct language | Within step instruction; use direct language | Within step instruction; use direct language |
| Procedure Instruction: Obtain resource for future step | Within step instruction; use direct language | Within step instruction; use direct language | Within step instruction; use direct language |
| Procedure Instruction: Notify a specific location or job position | Within step instruction; use direct language | Within step instruction; use direct language | Within step instruction; use direct language |
| Procedure Instruction: Obtain information from specific location or job position | Within step instruction; use direct language | Within step instruction; use direct language | Within step instruction; use direct language |
| Procedure Documentation: Step or Action Sign off | Yes | Maybe | No |
| Procedure Documentation: Step or Action Check-off | Yes | Maybe | Maybe |
| Procedure Documentation: Signature on completed procedure | At end | At end | Maybe |
| Procedure Documentation: Record step completion time | Yes if time | Yes at step | Not required |
| Procedure Documentation: Record process condition or data associated with step or action completion | At step; could be automatically entered | At step; could be automatically entered | At step; could be automatically entered |

Table 14 illustrates the various interaction techniques 210 available for hybrid on-line procedures based on the different classifications 206 of procedures.

TABLE 14

| Interaction | In-Task | Review | Resource |
|---|---|---|---|
| Procedure Structure | 1 level (flat) | 2 levels | 2 levels |
| Navigation to Procedure | Quick access; at console, intranet | intranet | In binder or intranet |
| Navigation between | None, should be | Overview map; | Overview map; |

TABLE 14-continued

| Interaction | In-Task | Review | Resource |
|---|---|---|---|
| steps and other items | direct and sequential | section headings; tabs | section headings; tabs |
| Procedure Format | Memory, checklist | Checklist and $1^{st}/2^{nd}$ level action descriptions; flowchart if there are complex dependencies | Checklist and $1^{st}/2^{nd}$ level action descriptions; flowchart if there are complex dependencies |
| Terminology | Short, direct | Short, direct | Short, direct |
| Status Format | Checkoffs/signoffs; data values at instruction or summary area; dependencies shown; activity shown | Checkoffs/signoffs; data values at instruction or summary area; dependencies shown; activity shown | Checkoffs; data values at instruction or summary area; dependencies shown |
| Data Entry | Stylus, keyboard; input devices, calculated | Stylus, keyboard; input devices, calculated | Stylus, keyboard; input devices, calculated |

A procedural overview may be needed for more complex hybrid on-line procedures, such as when a hybrid on-line procedure has multiple deviations. Procedural overviews may be similar to process schematics, where objects are task-based and mixed with process states to help convey the procedure status. A hybrid on-line procedure may appear to be sequential, but it may be able to handle deviations. This may require the use of status information and actions that need to be done to reach procedure objectives.

The above description may be more specific to hybrid on-line procedures used in the console context of use 208. In the field context of use 208, field personnel might have handheld computers or other small mobile devices for viewing and entering information, thereby limiting what the personnel can view and enter. Supplementary information could be accessed with different tabs, and the checklist format may be the most feasible or useful. Second-level action descriptions, notes, and other information could be accessed by a details screen, and automated input devices in the field may be preferable or desirable if keyboards are awkward to use.

The above types of procedures may have specific additional requirements if the procedures are to be provided to or used with electronic mobile devices (such as telephones, PDAs, tablets, or other mobile devices). The use of electronic mobile devices may allow, for example, reporting of the status of procedure steps in the field and coordination with other personnel to allow monitoring and tracking. The use of electronic mobile devices also allows personnel to access procedure information without needing to print out the procedure.

With these electronic mobile devices, a procedure could be displayed in its entirety, a selected part of the procedure could be displayed, or one or a few steps of the procedure could be displayed. If the entire procedure is displayed, various flagged levels could be shown to a user, and an abbreviated form or overview could be displayed if the procedure is lengthy. The overview could be navigated using tabs or other mechanisms. If a selected part of the procedure is shown, the preconditions and status of the procedure could be displayed. An abbreviated form or overview could be displayed if the portion of the procedure is lengthy, and the overview could be navigated using tabs or other mechanisms. If one or a few steps of the procedure are shown, the step(s) could be displayed with some contextual information (such as preconditions or time requirements), and the step(s) could be integrated with other tasks as checkoff items.

Connectivity with an electronic mobile device may vary depending on the situation. For example, a connection to an electronic mobile device and updating of procedure information could occur as requested, as one or more steps are completed, when a change in procedure state occurs, or after moving into a particular zone. The connection may be made in real-time, and the connection may allow for a high level of coordination between field personnel and other personnel. The connections and disconnections of the mobile devices could be provided to field operators and to console operators.

Although FIG. 2 illustrates one example of a method 200 for procedural operations development and distribution, various changes may be made to FIG. 2. For example, different assessments 204, classifications 206, contexts of use 208, effective interaction techniques 210, and effective procedures 212 could be used. Although FIGS. 3A and 3B illustrate examples of databases for storage and distribution of procedure-related information, various changes may be made to FIGS. 3A and 3B. As an example, databased having different contents or arrangements could also be used.

Figure 4:
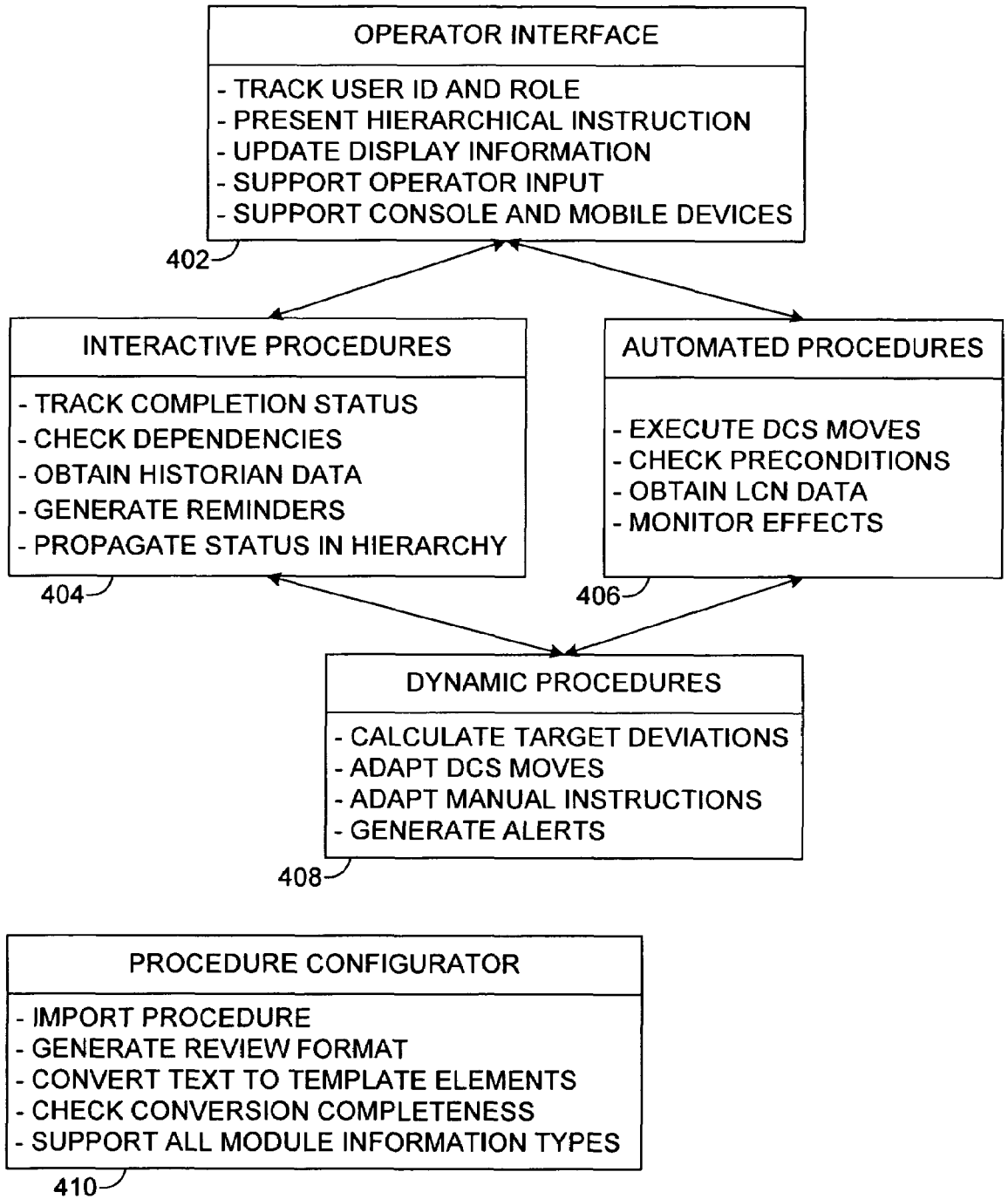
FIG. 4 illustrates additional details of an example system for procedural operations development and distribution according to one embodiment of this disclosure.

FIG. 4 illustrates additional details of an example system 100 for procedural operations development and distribution according to one embodiment of this disclosure. The additional details shown in FIG. 4 are for illustration only.

As shown in FIG. 4, an operator interface 402 allows users to view and interact with interactive procedures 404 and automated procedures 406. The users could be using user devices 102, such as mobile devices in the field or personal computers or other console computing devices. A user using a user device 102 may choose to use interactive procedures 404, automated procedures 406, or both. The operator interface 402 integrates the functionality of these two procedure types into an effective user interface framework for conducting procedural operations. The integration provides a single operator interface for both manual and automated step execution. Since the viewing capability on mobile devices may be significantly less than on a console or other monitor, the operator interface 402 may use formats that are designed for the appropriate user devices 102.

The interactive procedures 404 enable personnel to simultaneously view and interact with procedural instructions. This helps the personnel to track and report on the status of procedure steps. Historical process data may be available to assist personnel in understanding the process status relevant to a procedural activity. Reminders may be used to enhance the personnel's situational awareness of the need to attend to specific procedural steps. Links to other related documents and information may improve operator efficiency in performing procedural activities.

The automated procedures 406 may supplement the interactive procedures 404 with additional functionality that integrates distributed control system (DCS) automation. This provides automation capability with procedural sequence control and control system execution commands. Complex sequence control may be enabled with pre-conditions or post-conditions based on combinations of process-based or time-based parameters. The DCS commands can be operator-initiated or system-initiated as appropriate.

Dynamic procedures 408 enable context-sensitive or mode-based modifications to procedural steps and instructions. This dynamic capability enables the generation of procedures that have the potential to change the specific content of a step or the sequence of steps during the execution of the procedure. Without interaction with the dynamic procedures 408, the procedural representations provided by the interactive procedures 404 and the automated procedures 406 may be static. With the addition of the dynamic procedures 408, the procedural representations can be modified dynamically according to specific conditions, mode-based rules, or performance models. For example, a start-up ramp table may provide the basis for adjusting furnace temperature set points over a specific period of time. As another example, a mathematical formula may be used for keeping feed rates to a reactor adjusted to the available oxygen levels. Any calculations necessary for dynamic adjustments could come internally from the dynamic procedures 408 or from other integrated programs.

A procedure configurator 410 provides an environment to create, transform, and update interactive, semi-automated, dynamic, or other or additional procedures. The procedure configurator 410 could, for example, represent a development environment for procedures that is distinct from an operations environment. The procedure configurator 410 may be targeted to individuals who create, transform, and update procedures (such as trainers, dedicated procedure writers, supervisors, control engineers, or process engineers). The procedure configurator 410 could also track or identify changes that have been made from previous versions of a procedure.

Figure 5:
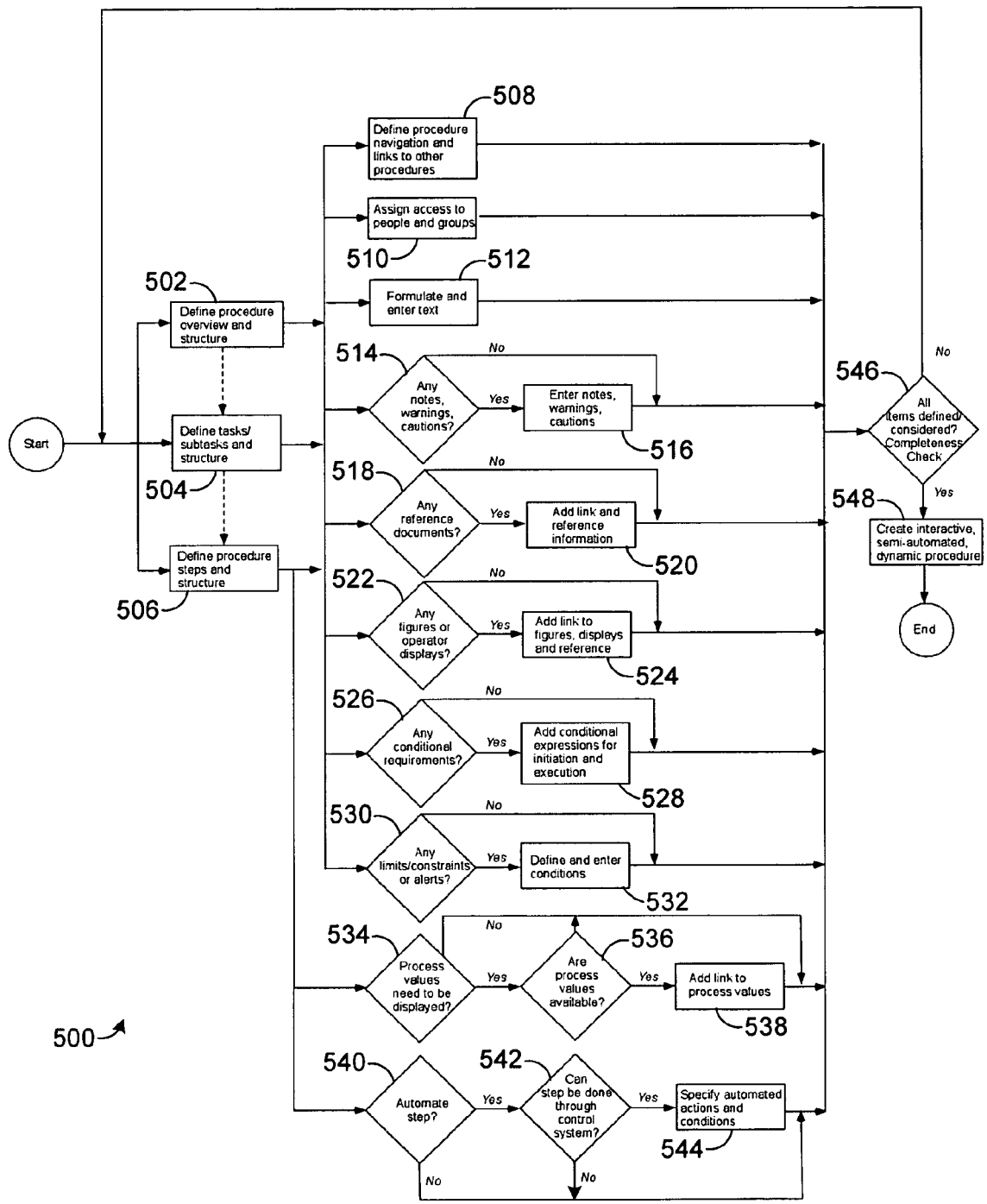
FIG. 5 illustrates an example method for creating and storing procedures according to one embodiment of this disclosure.

FIG. 5 illustrates an example method 500 for creating and storing interactive, semi-automated, dynamic, or other procedures, where the method 500 is used by the procedure configurator 410. As shown in FIG. 5, a user defines the structure of a procedure at different hierarchical levels (such as overview, tasks, and steps) at steps 502-506. In some embodiments, a procedure may have an overview and be formed from multiple tasks, and each task may involve one or more steps. In particular embodiments, the user may be given the option of defining up to n levels within a procedure (such as four levels), although the user does not have to use all of the levels.

For each part of the procedure hierarchy, specific configurations and information may be entered or imported at steps 508-544. This may include:

Navigation links: The user may define parallel, sequential, and other links for procedure flow at step 508. This could be done using a workflow visualization tool to map out the procedure flow in a block diagram format or by creating links within procedure text.

Assignment of access to people/groups: The user may define which individuals and groups can access all or part of the procedure for viewing and/or executing at step 510.

Procedure text: The user may enter the text and labels associated with the procedure overview, tasks, and steps at step 512. This may be shown as labels in the procedure hierarchy.

Warnings, cautions, notes: Extensive notes for particular steps in the procedure may be provided to guide operators when deviations occur. The user may enter this information in the configurator 410 at the appropriate parts of the procedure hierarchy at steps 514-516.

Reference documents: A large number of procedures reference other documents, such as schematic diagrams, appendices, backgrounds, introductions, related procedures and documents, operating manuals, deviation policies, Management of Change (MOC) information, Material Safety Data Sheets (MSDS), and explanatory materials. The user may enter references and provide hyperlinks to the reference documentation if available at steps 518-520.

Figures and operating displays: Some procedures reference operating displays and figures. It may be useful to have them readily available to the operator. The user may enter links to the operating displays and figures as required for specific steps or parts of the procedure hierarchy at steps 522-524.

Conditional requirements: The user may enter conditions and modes (internally or externally defined) associated with the procedure, tasks, and steps at steps 526-528. These can include:
  preconditions before a step can be performed;
  conditions that define when a step is complete (text or automated); or
  time-based conditions that require procedure steps to be initiated at particular times or performed within certain time intervals.

Status, limits, constraints, alerts: The user may define the status options, limits, and constraints associated with the procedure step and any alerts that result in deviations at steps 530-532.

Process values: The user may define which process values need to be available in the procedure step at steps 534-538. A placeholder could be defined for a process value, and a check with the historian 306 may be performed to ensure the variable is available at the required update frequency. If so, a connection may be created from the procedure step to the historian 306.

Automation of steps: The user may select the steps that are to be automated and define the control actions, initial conditions, and execution conditions at steps 540-544. A check with the distributed control system 308 may be performed to ensure that the control actions can be performed automatically. If so, a connection may be created from the procedure step to the distributed control system 308.

After the configurations and information are entered, the procedure configurator 410 performs completeness and consistency checks at step 546. This is done to help ensure that all required information has been provided by the user or imported and that the configurations and information are consistent with each other. Once the checks have been performed and a successful result obtained, a new procedure is created and saved in the database 110 at step 548.

The method 500 shown in FIG. 5 may form the basis for performing at least three different actions: creating new procedures, importing existing procedures, and updating existing procedures. The creation of a new procedure may follow the same flow as shown in FIG. 5. A user could enter the appropriate information manually, although various options could provide flexibility in entering the information. For example, a step-by-step wizard could show a step-by-step process to the user with examples and assistance, ask the user questions, and allow the user to enter information in a specific sequence. A direct entry approach could also be used, where users can directly navigate to the appropriate areas of the workflow shown in FIG. 5 using menus or navigation buttons.

The importing of existing procedures may be useful because many facilities and organizations have invested large amounts of resources in their current procedure management systems (which typically manage static procedures contained in word processing documents). A mechanism for importing existing procedures into the procedure configurator 410 may benefit a facility or organization by saving time and money over having to re-enter the procedures. The import function may take an existing static procedure in a standard format (such as a MICROSOFT WORD document or ADOBE PDF file) and prompt the user to categorize sections or portions of the procedure based on the procedure configurator's options in FIG. 5. Once these sections or portions are categorized, the user can finish the design by creating appropriate links to other parts of the procedure, the historian 306, the distributed control system 308, and other documentation. Consistency and completeness checks may prompt the user to areas that require further input.

More sophisticated import functions could also be used. These could include using tag names, phrases, and styles to automatically categorize the sections or portions of the imported procedure content. If the structure of a is static procedure can be inferred with direct transfer points to the procedure configurator 410, the import process could save users significant time.

The updating of existing procedures (such as existing interactive, semi-automated, and dynamic procedures) could involve updating procedures already created by the procedure configurator 410. In this example, the user may open an existing procedure using the procedure configurator 410, make the necessary modifications, perform consistency and completeness checks, and create a modified procedure.

Although FIG. 4 illustrates additional details of an example system 100 for procedural operations development and distribution, various changes may be made to FIG. 4. For example, other types of procedures (such as paper-based procedures or static on-line procedures) could be used in the system 100. Although FIG. 5 illustrates one example of a method 500 for creating and storing procedures, various changes may be made to FIG. 5. As an example, other methods that use different hierarchies or procedure-related content could be used to create a procedure.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
   storing information defining a plurality of procedures to be followed;
   receiving a first request for the information associated with at least one of the procedures;
   formatting the requested information based on a first platform to receive the requested information to produce first formatted requested information, wherein at least one of a content of the requested information, a structure of the requested information, and a navigation for accessing the requested information is based on the first platform to receive the requested information;
   providing the first formatted requested information to the first platform;
   receiving a second request for the information associated with the at least one procedure;
   formatting the requested information based on a second platform to receive the requested information to produce second formatted requested information; and
   providing the second formatted requested information to the second platform;
   wherein the second formatted requested information for the second platform is formatted differently than the first formatted requested information for the first platform.

2. The method of claim 1, wherein formatting the requested information to produce the first formatted requested information comprises selecting which portions of the requested information to provide based on the first platform.

3. The method of claim 1, wherein formatting the requested information to produce the first formatted requested information comprises formatting the requested information using one of a plurality of templates, the plurality of templates associated with a plurality of different procedure types.

4. The method of claim 1, wherein formatting the requested information to produce the first formatted requested information comprises formatting the requested information based on whether the requested information is to be presented via a console computing device, a mobile device, or a printed document.

5. The method of claim 1, further comprising receiving information defining at least one of: an overview of the procedure, one or more tasks of the procedure, and one or more steps of the procedure.

6. The method of claim 5, further comprising receiving information defining at least one of:
one or more links identifying a flow of the procedure;
one or more individuals or groups allowed to access at least part of the procedure; and
one or more warnings, cautions, notes, reference documents, figures, displays, status options, limits, constraints, or alerts associated with the procedure.

7. The method of claim 5, further comprising receiving information defining at least one of:
one or more process variables, each process variable having a value provided during execution of the procedure; and
one or more automated steps to be performed during execution of the procedure.

8. The method of claim 1, wherein storing the information defining the plurality of procedures comprises storing the information in a central database.

9. The method of claim 1, wherein a data enlty used with the at least one procedure and a status format identifying how a status of the at least one procedure is conveyed are based on the platform to receive the requested information.

10. An apparatus, comprising:
at least one memory for storing information defining one or more procedures to be followed; and
at least one processor for:
receiving a first request for the information associated with at least one of the procedures;
formatting the requested information based on a first platform to receive the requested information to produce first formatted requested information, wherein at least one of a content of the requested information, a structure of the requested information, and a navigation for accessing the requested infonmation is based on the first platform to receive the requested information;
providing the first formatted requested information to the first platform;
receiving a second request for the information associated with the at least one procedure;
formatting the requested information based on a second platform to receive the requested information to produce second formatted requested information; and
providing the second formatted requested information to the second platform;
wherein the second formatted requested information for the second platform is formatted differently than the first formatted requested information for the first platform.

11. The apparatus of claim 10, wherein the requested information is formatted to produce the first formatted requested information by selecting which portions of the requested information to provide based on the first platform.

12. The apparatus of claim 10, wherein one of a plurality of templates is used to format the requested information to produce the first formatted requested information, the plurality of templates associated with a plurality of different procedure types.

13. The apparatus of claim 10, wherein the requested information is formatted to produce the first formatted requested information based on whether the requested information is to be presented via a console computing device, a mobile device, or a printed document.

14. The apparatus of claim 10, wherein the at least one processor is further for receiving information defining at least one of: an overview of the procedure, one or more tasks of the procedure, and one or more steps of the procedure.

15. The apparatus of claim 14, wherein the at least one processor is further for receiving information defining at least one of:
one or more process variables, each process variable having a value provided during execution of the procedure; and
one or more automated steps to be performed during execution of the procedure.

16. The apparatus of claim 10, further comprising a central database for storing information defining a plurality of procedures including the one or more procedures to be followed.

17. A computer program embodied on a computer readable medium, the computer program comprising computer readable program code for:
receiving a first request for information associated with at least one of a plurality of procedures to be followed;
formatting the requested information based on a first platform to receive the requested information to produce first formatted requested information, wherein at least one of a content of the requested information, a structure of the requested information, and a navigation for accessing the requested information is based on the first platform to receive the requested information;
providing the first formatted requested information to the first platform;
receiving a second request for the information associated with the at least one procedure;
formatting the requested information based on a second platform to receive the requested information to produce second formatted requested information; and
providing the second formatted requested information to the second platform;
wherein the second formatted requested information for the second platform is formatted differently than the first formatted requested information for the first platform.

18. The computer program of claim 17, wherein the computer readable program code for formatting the requested information to produce the first formatted requested information comprises computer readable program code for selecting which portions of the requested information to provide based on the first platform.

19. The computer program of claim 17, wherein the computer readable program code for formatting the requested information to produce the first formatted requested information comprises computer readable program code for formatting the requested information using one of a plurality of templates, the plurality of templates associated with a plurality of different procedure types.

20. The computer program of claim 17, wherein the computer readable program code for formatting the requested information to produce the first formatted requested information comprises computer readable program code for formatting the requested information based on whether the requested information is to be presented via a console computing device, a mobile device, or a printed document.

21. The computer program of claim 17, further comprising computer readable program code for receiving and storing information defining:
at least one of: an overview of the procedure, one or more tasks of the procedure, and one or more steps of the procedure; and
at least one of: one or more process variables and one or more automated steps to be performed during execution of the procedure, each process variable having a value provided during execution of the procedure.

* * * * *

UNITED STATES PATENT AND TRADEMARK OFFICE
CERTIFICATE OF CORRECTION

PATENT NO. : 7,496,580 B2
APPLICATION NO. : 11/402458
DATED : February 24, 2009
INVENTOR(S) : John R. Hajdukiewicz et al.

It is certified that error appears in the above-identified patent and that said Letters Patent is hereby corrected as shown below:

In Column 39, line 22, delete "ently" add --entry--.

Signed and Sealed this

Twenty-eighth Day of April, 2009

JOHN DOLL
*Acting Director of the United States Patent and Trademark Office*